United States Patent [19]

Vachey

[11] Patent Number: 5,067,987

[45] Date of Patent: Nov. 26, 1991

[54] METHOD OF MANUFACTURING A SILVER ALLOY WHICH IS BLACKENED THROUGHOUT ITS BULK

[76] Inventor: Lucien Vachey, 45 avenue des Ternes, 75017 Paris, France

[21] Appl. No.: 455,431

[22] PCT Filed: Feb. 16, 1989

[86] PCT No.: PCT/FR89/00057
§ 371 Date: Nov. 3, 1989
§ 102(e) Date: Nov. 3, 1989

[87] PCT Pub. No.: WO89/08612
PCT Pub. Date: Sep. 21, 1989

[30] Foreign Application Priority Data

Mar. 7, 1988 [FR] France .................. 88 02879

[51] Int. Cl.$^5$ .................................. C22F 1/02
[52] U.S. Cl. ...................... 148/20.3; 75/414; 75/634; 148/430; 148/431; 423/511; 423/565
[58] Field of Search .............. 148/13.1, 281, 431, 148/430, 20.3; 75/414, 634; 423/511, 565

[56] References Cited

U.S. PATENT DOCUMENTS

| | | | |
|---|---|---|---|
| 2,091,259 | 8/1937 | Fisher | 423/565 |
| 4,467,856 | 8/1984 | Vachey | 164/47 |
| 4,676,969 | 6/1987 | Smith | 423/509 |

OTHER PUBLICATIONS

Gimelins Handbuch der anorganischen Chemie, p. 8.

*Primary Examiner*—R. Dean
*Assistant Examiner*—Robert R. Koehler
*Attorney, Agent, or Firm*—Krass & Young

[57] ABSTRACT

The present invention relates to manufacturing a silver alloy which is blackened throughout its bulk and used, for example, in jewelry. The method of manufacturing this material comprises putting the silver alloy into contact with sulfur in the form of sulfur vapor. The thickness of the wires or foils used in the method lies between about 1/10th of a millimeter and a few millimeters, and the time during which the silver alloy is exposed in the atmosphere of sulfur vapor is calculated as a function of this thickness. The silver alloy blackens due to sulfur/silver diffusion, and according to the present invention the silver alloy is heated to a predetermined temperature in order to optimize this diffusion as well as the microstructure of the resulting material.

10 Claims, No Drawings

METHOD OF MANUFACTURING A SILVER ALLOY WHICH IS BLACKENED THROUGHOUT ITS BULK

BACKGROUND OF THE INVENTION

1. Field of the Invention

The present invention relates to a method of manufacturing a material constituted by a blackened silver alloy, with the silver alloy being blackened throughout its bulk, the method including exposing the silver alloy to sulfur vapors.

2. Description of the Relevant Prior Art

French patent No. 2 516 548 describes a method of manufacturing silver blackened throughout its bulk by proposing several variants, one of which includes exposing a wire or a thin foil (about a few tenths of a millimeter thick) to sulfur vapors in order to blacken the silver by gas diffusion.

In order to speed up the blackening of the silver and to increase the efficiency of the method, said patent proposes increasing the pressure of the sulfur vapors, thereby enhancing sulfur/silver diffusion.

The object of the present invention in this new patent is to make the manufacturing method more effective with respect to production capacity while simultaneously also improving the quality and the microstructure of the final product.

SUMMARY OF THE INVENTION

According to the present invention, this object is achieved by a method which is characterized in that prior to being put into contact with the sulfur vapor, the silver alloy is heated to a temperature preferably lying between about 300° C. and about 700° C.

The temperature range 300° C. to 700° C. makes it possible to obtain a microstructure of satisfactory quality, with the optimum structure being obtained at a temperature lying in the range 450° C. to 500° c. Outside the range 300° C. to 700° C., the structure is not good enough for the material to be used in jewelry, it being observed that requirements for material quality are even more severe in watchmaking.

In one embodiment of the present invention, the silver alloy is used in the form of a wire which may be of various thicknesses, and the time for which said wire is put into contact with the sulfur vapors is a function of the wire gauge so as to ensure that the wire or wires are fully blackened throughout their bulk.

In another embodiment of the present invention, the silver alloy is used in the form of foil which may be of various thicknesses, with the time for which the foil is put into contact with the sulfur vapors likewise being a function of the thickness of said foil so as to ensure that it is completely blackened throughout its bulk.

The thicknesses of the silver alloy wires or foils suitable for use in a method of the present invention lie between about 0.1 mm to several mm. There is no lower limit on the thickness of the wires or the foils for implementing the method except with respect to ease of mechanical handling, and the upper limit of a few millimeters is likewise an imprecise limit since the interdiffusion between the silver alloy and the sulfur obeys a certain function with respect to time and high thickness in the base material merely extend the time required for exposure. In this way, the upper limit on the thickness of the silver alloy wire or wires or the foils is determined by questions of optimization rather than by technical constraints.

The silver alloy wires or foils are advantageously heated electrically, and electrical heating may be obtained by passing an electrical current through the alloy itself.

DETAILED DESCRIPTION OF THE PREFERRED EMBODIMENT

A method of manufacturing a blackened silver alloy in accordance with the present invention is now described in greater detail. A silver alloy is formed into wires or foils having a thickness lying in the range 0.1 mm to a few millimeters. The wire or wires or foils are disposed in an enclosure and subjected to sulfur vapors. The silver alloy wire or wires or foils are electrically connected to a current source so as to be heated by the current flowing through the silver alloy itself and being heated by its electrical resistance, or alternatively the silver alloy may be heated by some other source of heat by conduction or radiation. The silver alloy is preferably heated to a temperature lying in the range 300° C. to 700° C. and once this temperature has been reached, the enclosure containing the silver wire or wires or foils is filled with sulfur vapors in order to make contact with the heated silver alloy.

In this context, if may be observed that the silver alloy may be subjected to sulfur vapors at atmospheric pressure, or better at a higher pressure enabling a better result to be obtained in a shorter period of time.

The temperature of the silver alloy lying in the range 300° C. to 700° C. is selected so as to ensure optimum sulfur/silver alloy diffusion, said optimum diffusion being with reference to the speed of diffusion and to the quality of the microstructure of the blackened silver alloy obtained, and the exposure time is selected in such a manner that the blackening, i.e. the reaction of the sulfur on the crystals in the silver alloy structure can take place uniformly throughout the entire cross-section of the wire or foil. It is assumed that heating the base material prior to exposure to sulfur makes it possible for the diffusion to take place more quickly, more completely, and more uniformly, thereby avoiding exposing the outside portions of the wire or the foil to sulfur during an excessively long period of time which could have a detrimental effect on the surface quality. The optimum exposure time lies between 1 second and 10 minutes as a function of wire diameter between 0.1 mm and 5 mm, with exposure times between 2 minutes and 5 minutes being typical for a wire having a diameter of 2 mm. If the exposure time is too short, then the center of the wire is left in the non-transformed state, whereas if it is too long, then quality deteriorates. The microstructure is such as to ensure a quality of material whose surface is clean, without various porous and dense or dusty layers being formed as happens when the temperature is not high enough, and which may lead to poor adherence and sometimes to an interface between two structures. As a result, the material obtained in this way can be used directly for manufacturing objects of all shapes, and for all applications, as in jewelry, watchmaking, or silver smithery, or other professions.

The material obtained in this way may be used as such for forming objects using any hot or cold mechanical forming technique and it may be melted down and cast to make objects of special shapes. Melting down this material and casting it gives rise to no segregation effect or other deterioration in its initial properties, so its utilization is not limited to any particular jewelry manufacturing techniques.

EXAMPLE

Silver alloy wires having a diameter of 2 mm are placed in a treatment receptacle in which they are heated to a temperature of 450° C. After reaching this temperature, the enclosure is put into communication with sulfur vapors via any appropriate technique, e.g. by being connected to a container containing sulfur boiling at a temperature of about 444° C. The atmosphere surrounding the silver alloy wires is saturated with sulfur vapor at a temperature of 450° C. to 500° C., and the silver alloy wires are exposed to this atmosphere for 4 minutes.

After this exposure, communication between the enclosure and the molten sulfur container is interrupted, and the silver alloy wires are cooled down in hot surrounding prior to being withdrawn from the enclosure, thereby avoiding any deterioration of their surface by oxygen while they are still hot.

The wires withdrawn from the enclosure are constituted by a silver alloy which is blackened right through to the center of each wire, with the wires being smooth and bright on their surfaces and no low-adherence deposit can be observed on the surfaces of the wires.

The wires are melted down and cast in a mold of arbitrary shape, with the surface of the cast object after unmolding being clean and requiring no treatment other than a short period of sand blasting.

The invention has been described by means of an example, but it is not limited to this example. On the contrary, the invention may be modified or varied by the person skilled in the art, in particular with respect to the shape of the starting material which may be other than a wire or a foil, and also with respect to the temperatures of the silver alloy and the time for which it is exposed to sulfur.

I claim:

1. A method of manufacturing a blackened silver alloy which is blackened throughout its bulk, the method including the steps of:
    heating the silver alloy to a temperature lying between about 450° C. and about 700° C.; and,
    subsequently exposing the heated silver alloy to sulfur vapor.

2. A method according to claim 1, wherein the silver alloy is supplied in the form of wire having a diameter, said wire remaining in contact with the sulfur vapor for a time period which is functionally dependent on the wire diameter so as to ensure that the wire is blackened throughout its bulk.

3. A method according to claim 2, wherein the time during which the silver alloy is exposed to the sulfur vapors lies between about 1 second and about 10 minutes for a wire having a diameter between 0.1 mm and 5 mm.

4. A method according to claim 1, wherein the alloy is supplied in the form of foil having a thickness, said foil remaining in contact with the sulfur vapor for a time period which is functionally dependent on the thickness of the foil so as to ensure that the foil is completely blackened throughout its bulk.

5. A method according to claim 4, wherein the time during which the silver alloy is exposed to the sulfur vapor lies between about 1 second and about 10 minutes for a foil having a thickness lying between 0.1 mm and 5 mm.

6. A method according to claim 1, wherein the silver alloy is heated by electrical heating.

7. A method according to claim 6, wherein the silver alloy is heated by passing an electrical current therethrough.

8. A method according to claim 1, wherein the silver alloy is heated by conduction.

9. A method according to claim 1, wherein the silver alloy is heated by radiation.

10. A method according to claim 1, wherein the silver alloy is heated to a temperature lying between about 450° C. and about 500° C.

* * * * *